(12) United States Patent
Tahara

(10) Patent No.: US 12,067,677 B2
(45) Date of Patent: Aug. 20, 2024

(54) INFORMATION PROCESSING APPARATUS, INFORMATION PROCESSING METHOD, AND COMPUTER-READABLE STORAGE MEDIUM

(71) Applicant: Sony Group Corporation, Tokyo (JP)

(72) Inventor: Daisuke Tahara, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/777,416

(22) PCT Filed: Dec. 10, 2020

(86) PCT No.: PCT/JP2020/045994
§ 371 (c)(1),
(2) Date: May 17, 2022

(87) PCT Pub. No.: WO2021/131738
PCT Pub. Date: Jul. 1, 2021

(65) Prior Publication Data
US 2024/0005600 A1  Jan. 4, 2024

(30) Foreign Application Priority Data

Dec. 27, 2019 (JP) .................. 2019-239053

(51) Int. Cl.
*G06T 17/10* (2006.01)
*G06F 3/01* (2006.01)
*G06T 7/20* (2017.01)

(52) U.S. Cl.
CPC .............. *G06T 17/10* (2013.01); *G06F 3/011* (2013.01); *G06F 3/015* (2013.01); *G06T 7/20* (2013.01)

(58) Field of Classification Search
CPC .......... G06T 17/10; G06T 7/20; G06T 7/251; G06T 7/292; G06T 7/75;
(Continued)

(56) References Cited

U.S. PATENT DOCUMENTS 9,355,305 B2 * 5/2016 Tanabiki ................ G06V 40/23
10,617,474 B2 * 4/2020 Karlsson ................... A61F 2/42
(Continued)

FOREIGN PATENT DOCUMENTS

JP  2006-148201 A  6/2006
JP  2010-17447 A  1/2010
(Continued)

OTHER PUBLICATIONS

International Search Report issusd March 2. 2021 in PCT/JP2020/045994 filed on Dec. 10, 2020, 7 pages.
(Continued)

*Primary Examiner* — Vijay Shankar
(74) *Attorney, Agent, or Firm* — Oblon, McClelland, Maier & Neustadt, L.L.P.

(57) ABSTRACT

An information processing apparatus, method, and non-transitory computer-readable storage medium that estimate a three-dimensional skeleton based on images captured from a plurality of viewpoints, and generate a skeleton model by modeling the three-dimensional skeleton. The information processing apparatus, method, and non-transitory computer-readable storage medium further model a joint in a spherical shape or a bone in a cylindrical shape in the three-dimensional skeleton, and set a radius of a sphere of the joint or a radius of a cylinder of the bone according to a distance between any one of the plurality of viewpoints or a virtual viewpoint and the joint or the bone.

18 Claims, 13 Drawing Sheets

(58) Field of Classification Search
CPC . G06T 2207/20084; G06T 2207/30196; G06T 2207/30221; G06T 2219/2012; G06T 19/006; G06T 19/20; G06T 2200/24; G06T 2210/41; G06T 2219/2016; G06T 2219/2021; G06T 11/60; G06F 3/011; G06F 3/015; G06F 3/016; G16H 50/20; G16H 30/20; G16H 30/40; G16H 50/50; A61B 6/466; A61B 6/505; A61B 34/10; A61B 2034/105

See application file for complete search history.

(56) References Cited

U.S. PATENT DOCUMENTS

| | | | | |
|---|---|---|---|---|
| 11,224,483 | B2* | 1/2022 | Steinberg | A61B 90/36 |
| 11,621,086 | B2* | 4/2023 | Spångberg | G16H 50/20 |
| | | | | 382/131 |
| 11,648,405 | B2* | 5/2023 | Crites-Bachert | A61N 1/372 |
| | | | | 606/129 |
| 11,751,946 | B2* | 9/2023 | Gangwar | G06T 7/73 |
| | | | | 345/418 |
| 2008/0221487 | A1* | 9/2008 | Zohar | A61B 5/1127 |
| | | | | 600/595 |
| 2013/0230211 | A1* | 9/2013 | Tanabiki | G06T 7/75 |
| | | | | 382/103 |
| 2017/0177930 | A1 | 6/2017 | Holohan | |
| 2023/0005232 | A1* | 1/2023 | Harris, Jr. | A61B 6/505 |
| 2023/0316686 | A1* | 10/2023 | Moodley | G06N 3/045 |
| | | | | 345/419 |

FOREIGN PATENT DOCUMENTS

| | | |
|---|---|---|
| JP | 2010-520561 A | 6/2010 |
| JP | 2014-68714 A | 4/2014 |
| JP | 2014-228595 A | 12/2014 |
| WO | WO-2009061283 A2 | 5/2009 |
| WO | WO 2012/046392 A1 | 4/2012 |
| WO | WO 2019/018152 A1 | 1/2019 |

OTHER PUBLICATIONS

Zhe Cao et al., "Realtime Multi-Person 2D Pose Estimation using Part Affinity Fields", CVPR 2017 Oral, Video result: https://youtu.be/pW6nZXeWIGM. pp. 7291-7299.

Bridgeman, Lewis, et al, "Multi-Person 3D Pose Estimation and Tracking in Sports", 2019 IEEE/CVF Conference on Computer Vision and Pattern Recognition Workshops (CVPRW), IEEE, Jun. 16, 2019 (Jun. 16, 2019), pp. 2487-2496, XP033747128, DOI: 10.1109/CVPRW.2019.00304.

Stoll, Carsten, et al, "Fast Articulated Motion Tracking using a Sums of Gaussians Body Model", 2011 IEEE International Conference on Computer Vision (ICCV), IEEE, Nov. 6, 2011 (Nov. 6, 2011), pp. 951-958, XP032101291, DOI: 10.1109/ICCV.2011.6126338 ISBN: 978-1-4577-1101-5.

Habermann, Marc, et al, "LiveCap: Real-Time Human Performance Capture From Monocular Video", ACM Transactions on Graphics, ACM, NY, US, vol. 38, No. 2, Mar. 13, 2019 (Mar. 13, 2019), pp. 1-17, XP058685219, ISSN: 0730-0301, DOI: 10.1145/3311970.

Sigalas, Markos, et al, "Full-Body Pose Tracking—The Top View Reprojection Approach", IEEE Transactions on Pattern Analysis and Machine Intelligence, IEEE Computer Society, USA, vol. 38, No. 8, Aug. 1, 2016 (Aug. 1, 2016), pp. 1569-1582, XP011615565, ISSN: 0162-8828, DOI: 10.1109/TPAMI.2015.2502582.

* cited by examiner

INFORMATION PROCESSING APPARATUS, INFORMATION PROCESSING METHOD, AND COMPUTER-READABLE STORAGE MEDIUM

FIELD

The present disclosure relates to an information processing apparatus, an information processing method, and an information processing program.

BACKGROUND

Motion capture has been utilized in various scenes such as creation, analysis, and editing of computer graphics typically for sports and games.

For example, motion capture using inertial navigation for three-dimensional skeleton estimation is known. In the motion capture using inertial navigation, a position of each joint is measured from sensor data acquired by a motion sensor attached to the joint. In this way, in a case where inertial navigation is used for the motion capture, attachment of the motion sensor is inevitable. Therefore, attachment of the motion sensor hinders an operation such as in a sport or game competition, or deteriorates a visual value such as realistic feeling of a live-action video.

Furthermore, one technique of markerless motion capture called OpenPose proposes detection of two-dimensional posture from an image of a monocular camera.

CITATION LIST

Patent Literature

Patent Literature 1: WO 2019/016152 A

Non Patent Literature

Non Patent Literature 1: Zhe Cao, Tomas Simon, Shih-EnWei, Yaser Sheikh "Realtime Multi-Person 2D Pose Estimation using Part Affinity Fields"

SUMMARY

Technical Problem

However, in the above OpenPose, since only two-dimensional posture is detected, it is difficult to accurately detect a skeleton part hidden by occlusion. Thus, only a skeleton model lacking stereoscopic effect can be generated.

Therefore, it is an object of the present disclosure to provide an information processing apparatus, an information processing method, and an information processing program capable of generating a stereoscopic skeleton model.

Solution to Problem

To solve the problems described above, an information processing apparatus according to an embodiment of the present disclosure includes: an estimation unit that estimates a three-dimensional skeleton based on images captured from a plurality of viewpoints; and a generation unit that generates a skeleton model by modeling the three-dimensional skeleton.

2. The information processing apparatus according to claim 1, wherein
the generation unit models a joint in a spherical shape and a bone in a cylindrical shape in the three-dimensional skeleton.

DESCRIPTION OF EMBODIMENTS

Hereinafter, embodiments of the present disclosure will be described with reference to the drawings. In each of the following embodiments, same parts are given the same reference signs to omit redundant description.

The present disclosure will be described according to the following item order.

1. First Embodiment 1-1. System configuration example
1-1-1. Server device
1-1-2. Camera
1-1-3. Client terminal
1-2. One aspect of approach to solving problems
1-3. Functional configuration example of server device
1-3-1. Communication interface
1-3-2. Storage unit
1-3-2-1. Camera parameter
1-3-2-2. Three-dimensional skeleton data
1-3-3. Control unit
1-3-3-1. Acquisition unit
1-3-3-2. Estimation unit
1-3-3-3. Generation unit
1-4. Processing procedure of server device
1-5. One aspect of effect
2. Second Embodiment
2-1. Functional configuration example of server device
2-1-1. Setting unit
2-2. Processing procedure of server device
2-3. One aspect of effect 3. Application example
3-1. Computer Graphics (CG) character model
3-2. Link with individual identification
3-3. Visualization of skeleton estimation accuracy
3-4. Track of skeleton part
4. Modifications
5. Hardware configuration

1. First Embodiment

1-1. System Configuration Example

Figure 1:
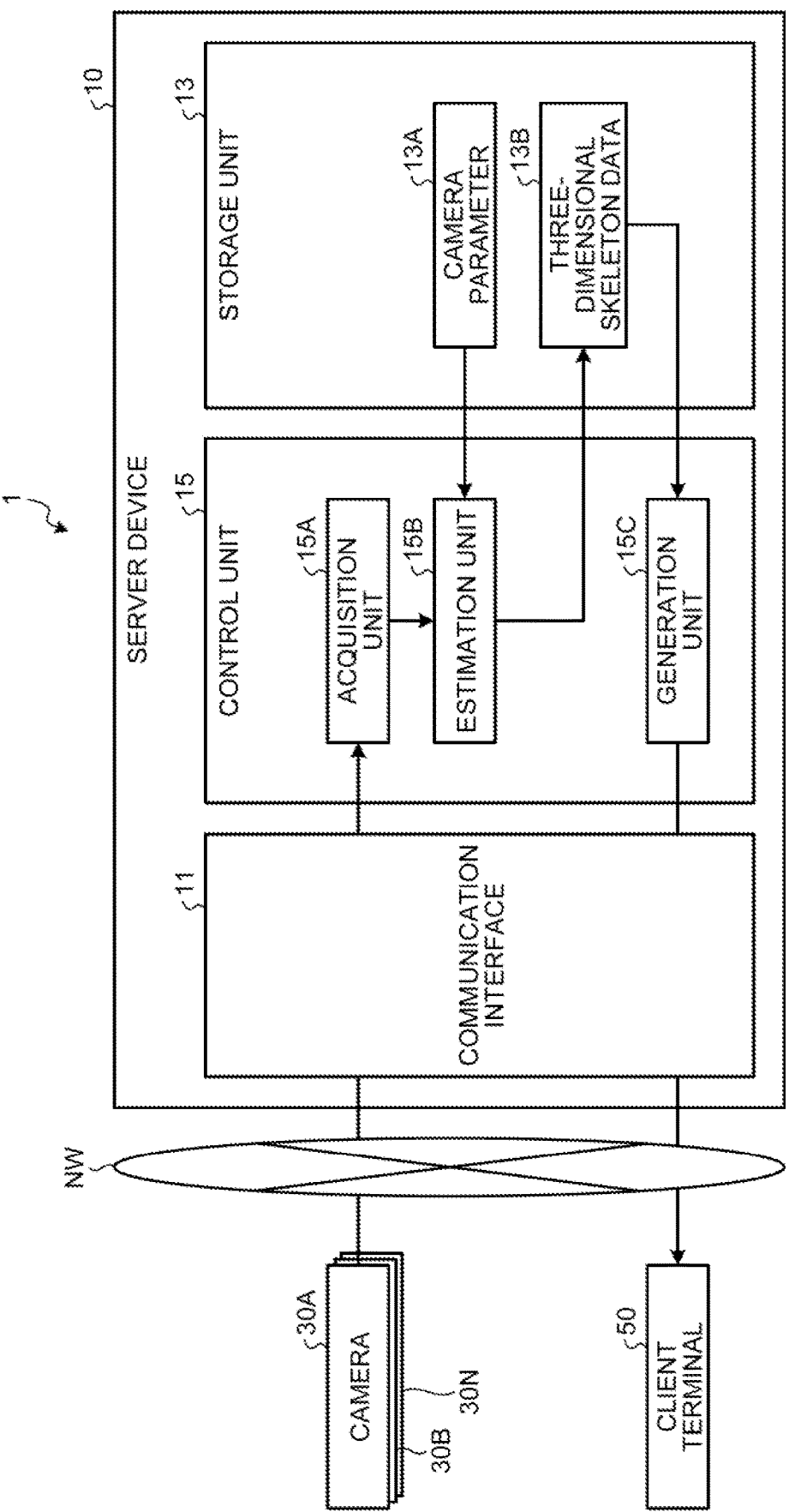
FIG. 1 is a diagram illustrating a configuration example of a system according to a first embodiment.

FIG. 1 is a diagram illustrating a configuration example of a system 1 according to a first embodiment. The system 1 illustrated in FIG. 1 provides an image generation service for generating, as computer graphics, a three-dimensional skeleton model in which a three-dimensional skeleton obtained by markerless motion capture is modeled.

As one aspect, the image generation service can be utilized in various use cases such as creation, analysis, and editing of computer graphics typically for sports and games.

Hereinafter, from a viewpoint of distinguishing an image captured by a camera 30, i.e., a live-action video label, from a skeleton image including the three-dimensional skeleton model, i.e., computer graphics, an image captured by the camera 30 may be referred to as a "captured image".

As illustrated in FIG. 1, the system 1 may include a server device 10, cameras 30A to 30N, and a client terminal 50. Hereinafter, the cameras 30A to 30N may be referred to as the "camera 30" when it is not necessarily to distinguish each of the cameras 30A to 30N. Although FIG. 1 illustrates an example in which one client terminal 50 is included in the system 1, a plurality of client terminals 50 may be included.

The server device 10, the camera 30, and the client terminal 50 can be connected via an arbitrary network NW. For example, the network NW may be any type of communication network such as the Internet or a local area network (LAN) regardless of whether it is wired or wireless.

Note that FIG. 1 illustrates a case where the server device 10 provides the skeleton image including the three-dimensional skeleton model to the client terminal 50 via the network NW, but the server device 10 and the client terminal 50 may not necessarily communicate with each other bidirectionally. For example, the skeleton image may not necessarily be provided via the network NW, and may be provided from the server device 10 to the client terminal 50 via a broadcast wave.

<1-1-1. Server Device>

The server device 10 is a computer that provides the above-described image generation service. The server device 10 may correspond to an example of an information processing apparatus.

As an embodiment, the server device 10 can be implemented by causing a desired computer to install an image generation program that realizes a function corresponding to the above-described image generation service as package software or online software. For example, the server device 10 can be implemented as, for example, a Web server that provides on premise the above-described functions related to the image generation service. The present disclosure is not limited thereto, and the server device 10 may provide the above-described image generation service as a cloud service by being implemented as a software as a service (SaaS) type application.

<1-1-2. Camera>

The camera 30 is an example of an imaging device equipped with an imaging element such as a charge coupled device (CCD) or a complementary metal oxide semiconductor (CMOS).

For example, by combining photographing ranges of a plurality of cameras 30, each camera 30 is arranged such that the entire area of a three-dimensional space where a generation target of computer graphics, such as a sport or game competition, is performed falls within the photographing ranges of the plurality of cameras 30. Furthermore, from the aspect of estimating the three-dimensional skeleton of a subject present in the three-dimensional space from captured images captured by the two or more cameras 30, each camera 30 can be arranged in a state that a part of the photographing range overlaps with that of another camera 30. With this arrangement, the plurality of cameras 30 synchronously capture images for each frame, so that a plurality of images captured at the same timing from different viewpoints, i.e., multi-view captured images, can be obtained in units of frames. Note that it is apparent that the frame rates at which the cameras 30 capture images are also unified to the same frame rate.

<1-1-3. Client Terminal>

The client terminal 50 corresponds to an example of a computer that receives a function corresponding to the above-described image generation service. For example, a desktop computer such as a personal computer may correspond to the client terminal 50. This is merely an example, and the client terminal 50 may be any computer such as a laptop computer, a mobile terminal device, or a wearable terminal.

Note that FIG. 1 illustrates an example in which the system 1 is constructed as a client server system including the server device 10 and the client terminal 50. However, the configuration example of the system 1 is not limited thereto. For example, the function corresponding to the above image generation service may be realized by a computer that operates in a standalone manner.

1-2. One Aspect of Approach to Solving Problems

As described in the background section above, attachment of a motion sensor is inevitable in motion capture using inertial navigation. Therefore, attachment of the motion sensor hinders an operation such as in a sport or game competition, or deteriorates a visual value such as realistic feeling of a live-action video. Thus, in motion capture using the inertial navigation, markerless motion capture cannot be realized.

However, in OpenPose, only two-dimensional posture is detected, and thus, it is not possible to accurately detect a posture of a skeleton part hidden by occlusion. Therefore, only a skeleton model lacking stereoscopic effect can be generated by OpenPose.

Furthermore, even when a depth sensor such as Kinect is used in combination, the above-described occlusion problem cannot be solved. Furthermore, a technique of estimating joint depth information by machine learning called monocular three-dimensional posture estimation has also been developed. However, since the estimation is made by machine learning for an indefinite problem, it is difficult to accurately estimate the joint depth information.

Therefore, the server device 10 of the present disclosure estimates a three-dimensional skeleton by images captured from multiple viewpoints as a part of the above-described image generation service. As a result, a skeleton part hidden by occlusion can be estimated, and three-dimensional skeleton estimation can also be realized by markerless motion capture. Then, the server device 10 of the present disclosure generates the three-dimensional skeleton model in which the three-dimensional skeleton estimated in this manner is modeled. Therefore, according to the server device 10 of the present disclosure, it is possible to generate a stereoscopic skeleton model.

1-3. Functional Configuration Example of Server Device

Next, a functional configuration example of the server device 10 of the present disclosure will be described. FIG. 1 schematically illustrates blocks corresponding to the functions of the server device 10 among devices included in the system 1. As illustrated in FIG. 1, the server device 10 includes a communication interface 11, a storage unit 13, and a control unit 15.

Note that FIG. 1 merely illustrates excerpted functional units related to the above-described image generation service, and does not prevent functional units other than those illustrated, for example, functional units equipped by default or optionally in an existing computer, from being provided in the server device 10.

<1-3-1. Communication Interface>

The communication interface 11 corresponds to an example of a communication control unit that performs communication control with another device such as the camera 30 or the client terminal 50.

As an example, a network interface card such as a LAN card can be adopted as the communication interface 11. For example, the communication interface 11 notifies each camera 30 of an imaging start instruction and an imaging end instruction of a captured image, or receives the captured image from the camera 30. Furthermore, the communication interface 11 receives various setting operations regarding viewing of the skeleton image, e.g., a setting operation of a camera viewpoint such as a virtual viewpoint, from the client terminal 50 and outputs the skeleton image.

<1-3-2. Storage Unit>

The storage unit 13 may correspond to hardware that stores data used for various programs such as an operating system (OS) executed by the control unit 15 and the above-described image generation program.

As one embodiment, the storage unit 13 may correspond to an auxiliary storage device in the server device 10. For example, a hard disk drive (HDD), an optical disk, a solid state drive (SSD), or the like corresponds to the auxiliary storage device. In addition, a flash memory such as an erasable programmable read only memory (EPROM) may also correspond to the auxiliary storage device.

The storage unit 13 stores a camera parameter 13A and three-dimensional skeleton data 13B as an example of data used for the program executed by the control unit 15. In addition to the camera parameter 13A and the three-dimensional skeleton data 13B, the storage unit 13 can store various types of data such as the captured image from each viewpoint and account information of a user of the client terminal 50.

<1-3-2-1. Camera Parameter>

The camera parameter 13A is data related to a camera parameter. As an example, the camera parameters 13A may include an external parameter such as a position and orientation of each camera 30 and an internal parameter such as an angle of view of each camera 30 and lens distortion.

<1-3-2-2. Three-Dimensional Skeleton Data>

The three-dimensional skeleton data 13B is data related to an estimation result of the three-dimensional skeleton. As an example, in the three-dimensional skeleton data 13B, a position of a joint of the subject in the three-dimensional space is estimated by an estimation unit 15B described later for each frame of the captured image captured by the camera 30. As described above, the three-dimensional skeleton data 13B may include, as an example, time-series data of the position of each joint in the three-dimensional space. Furthermore, in addition to the position in the three-dimensional space, the three-dimensional skeleton data 13B may include a posture of each joint in the three-dimensional space, e.g., a joint angle calculated based on inverse kinematics.

<1-3-3. Control Unit>

The control unit 15 is a processor that controls the entire server device 10.

As one embodiment, the control unit 15 can be implemented by a hardware processor such as a central processing unit (CPU) or a micro processing unit (MPU). Here, the CPU and the MPU are given as an example of the processor, but the processor can be implemented by any processor regardless of the general-purpose type or the specialized type. In addition, the control unit 15 may be realized by hard-wired logic such as an application specific integrated circuit (ASIC) or a field programmable gate array (FPGA).

The control unit 15 virtually realizes the following processing units by developing the above-described image generation program on a work area of a random access memory (RAM) mounted as a main storage device (not illustrated). Note that, although FIG. 1 illustrates functional units corresponding to the above-described image generation program, functional units corresponding to packaged software in which a program module corresponding to the above-described image generation program is packaged with another function may be included.

As illustrated in FIG. 1, the control unit 15 includes an acquisition unit 15A, an estimation unit 15B, and a generation unit 15C.

<1-3-3-1. Acquisition Unit>

The acquisition unit 15A is a processing unit that acquires the captured image from each viewpoint.

As one embodiment, the acquisition unit ISA can acquire the captured images from the respective viewpoints transmitted from the cameras 30A to 30N in units of frames. Here, an information source from which the acquisition unit 15A acquires the captured images may be any information source, and is not limited to the camera 30. For example, the acquisition unit 15A may also acquire multi-view captured images from an auxiliary storage device such as a hard disk or an optical disk that accumulates captured images from respective viewpoints, or a removable medium such as a memory card or a universal serial bus (USB) memory. In addition, the acquisition unit 15A can also acquire the captured image from each viewpoint from an external device other than a camera 5 via the network NW.

<1-3-3-2. Estimation Unit>

The estimation unit 15B is a processing unit that estimates the three-dimensional skeleton based on the captured image from each viewpoint.

As one embodiment, the estimation unit 15B inputs the captured image to a model obtained through machine learning such as deep learning for each viewpoint of the camera 30, thereby obtaining an output such as a map of a certainty of a position of each joint in the captured image. Then, the estimation unit 15B estimates the position of each joint in the three-dimensional space by performing triangulation between captured images based on the position of the joint obtained for each captured image. Furthermore, the estimation unit 15B can calculate the posture of each joint in the three-dimensional space by calculating a joint angle based on inverse kinematics using the position of each joint in the three-dimensional space. As described above, the position and posture of each joint in the three-dimensional space obtained for each frame of the captured image are stored in the storage unit 13 as three-dimensional skeleton data.

Note that, here, a case where the position and posture of each joint in the three-dimensional space are estimated using a person as a mere example of the subject. A three-dimensional model of an environment other than the person can also be generated.

<1-3-3-3. Generation Unit>

The generation unit 15C is a processing unit that generates the skeleton model in which the three-dimensional skeleton is modeled.

As one aspect, the generation unit 15C renders the skeleton image from viewpoints of the cameras 30A to 30N or any virtual viewpoint in the three-dimensional space. For example, the generation unit 15C renders the three-dimensional skeleton model of the subject for each subject based on the viewpoint position at which the user setting by the client terminal 50 or the system setting is performed and the position of the joint included in the three-dimensional skeleton data 13B.

Figure 2:
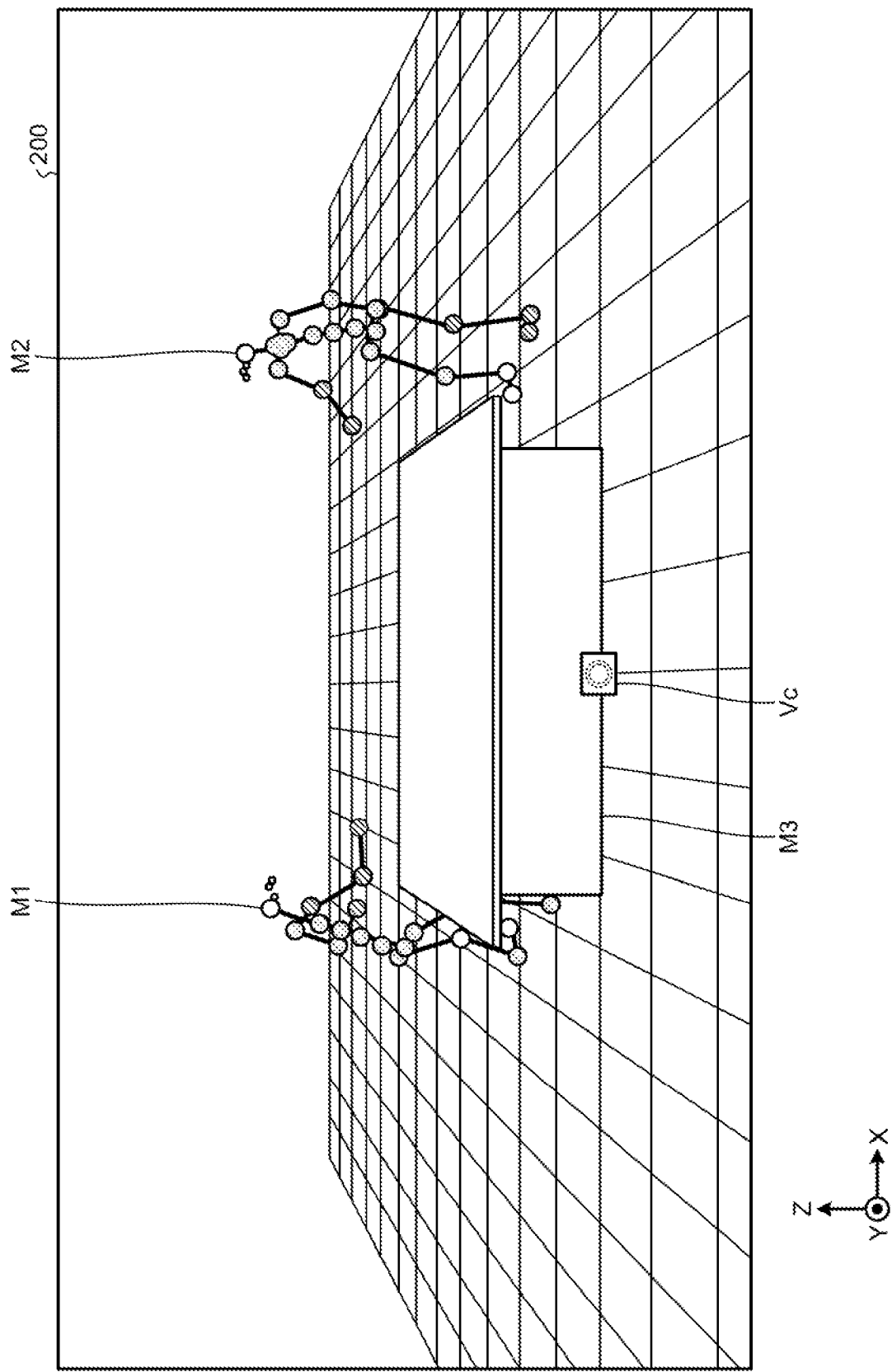
FIG. 2 is a diagram illustrating an example of a skeleton image.

FIG. 2 is a diagram illustrating an example of the skeleton image. As an example, FIG. 2 illustrates a skeleton image 200 generated from a captured image of a table tennis game. Furthermore, FIG. 2 illustrates a skeleton image 200 in a case where a position of a center front in the longitudinal direction of a table for table tennis is set to a virtual viewpoint Vc. As illustrated in FIG. 2, three-dimensional skeleton models M1 and M2 corresponding to two players playing a table tennis game are rendered in the skeleton image 200. Furthermore, in the skeleton image 200, a three-dimensional model M3 corresponding to the table for table tennis is rendered as an example of the three-dimensional model of an environment other than persons. Here, the three-dimensional model M3 of the table for table tennis is not necessarily modeling data generated from the captured image. For example, an environmental object having no change in position or posture in the three-dimensional space, such as the three-dimensional model M3, may be modeling data created in advance. Such modeling data can be added to the skeleton image 200. As described above, since the three-dimensional skeleton model is rendered in the skeleton image 200, a capability to express a skeleton part hidden by occlusion is also improved.

Figure 3:
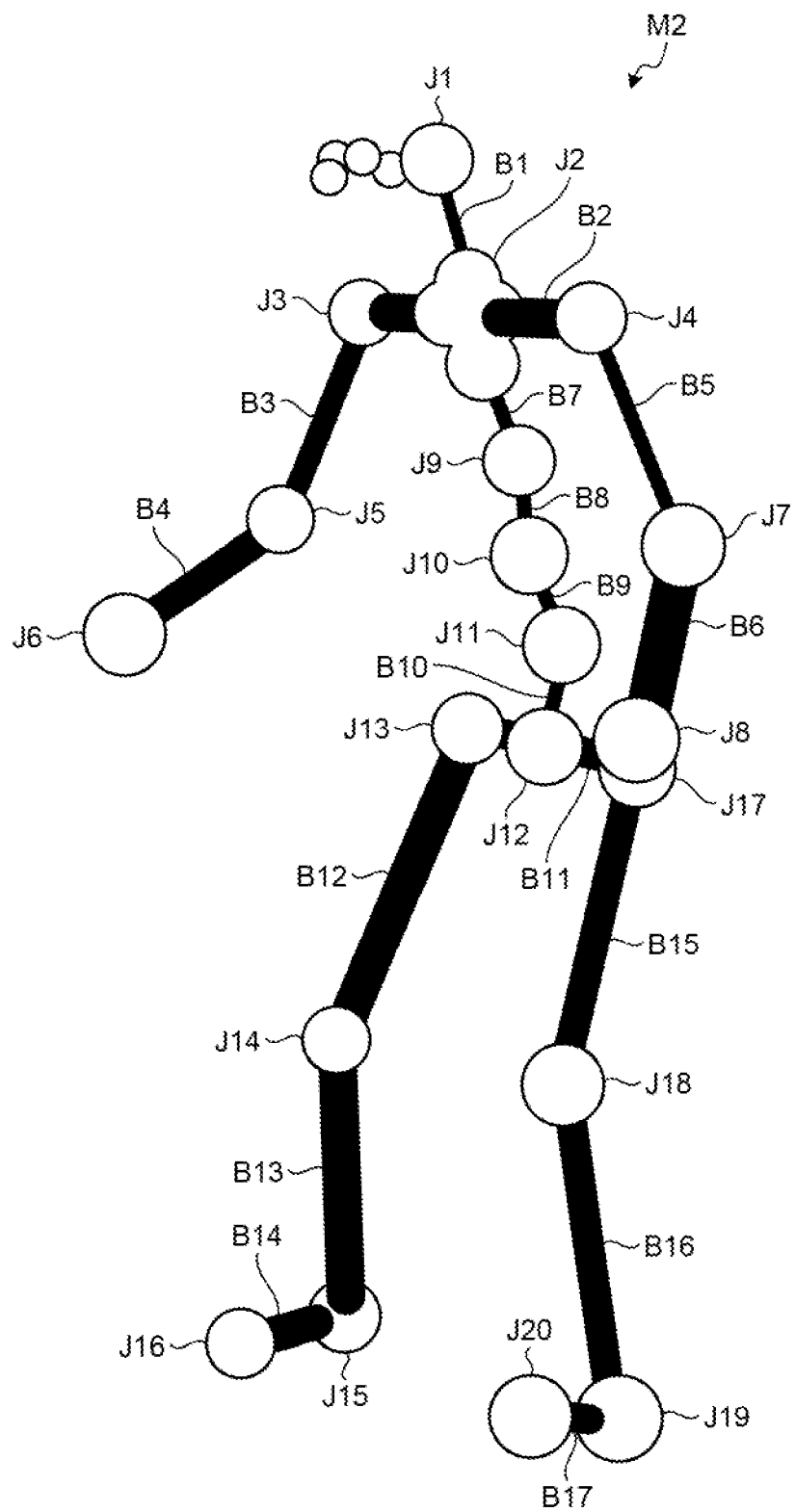
FIG. 3 is a diagram illustrating an example of a three-dimensional skeleton model.

FIG. 3 is a view illustrating an example of the three-dimensional skeleton model. FIG. 3 illustrates the three-dimensional skeleton model M2 illustrated in FIG. 2 in an enlarged manner. As illustrated in FIG. 3, the three-dimensional skeleton model M2 includes joints J1 to J20 corresponding to a head including feature points such as eyes and a nose, and parts such as collarbones, left and right shoulders, elbows, wrists, shoulders, elbows, wrists, a waist, knees, ankles, and toes, and bones B1 to B17 connecting the respective joints. When the three-dimensional skeleton model M2 is generated in this manner, the joints J1 to J20 are modeled in a spherical shape, while the bones B1 to B17 are modeled in a linear or cylindrical shape.

Here, sizes of spheres representing the joints J1 to J20 are set according to the virtual viewpoint Vc and distances between the joints J1 to J20. For example, a radius of a joint sphere is set to be larger as the distance from the virtual viewpoint. Vc becomes shorter. In other words, as the joint is located on the nearer side, the joint sphere is set to be larger. On the other hand, as the distance from the virtual viewpoint Vc becomes longer, i.e., on the further side, the radius of the joint sphere is set smaller. Taking an example of the joint J4, the joint J7, and the joint 38 as merely one aspect, an order of shorter distances from the virtual viewpoint Vc is the joint J8, the joint J7, and the joint J4. In this case, as illustrated in FIG. 3, the radius of each of the spheres of the joint 34, the joint J7, and the joint 38 are set to satisfy J8>J7>J4.

Furthermore, sizes of cylinders representing the bones B1 to B17 are set according to the virtual viewpoint Vc and distances between the bones B1 to B17. For example, a radius of a bone cylinder is set to be larger as the distance from the virtual viewpoint Vc becomes shorter, i.e., on the nearer side. On the other hand, as the distance from the virtual viewpoint Vc becomes longer, i.e., on the further side, the radius of the bone cylinder is set smaller. Taking an example of the bone B5 and the bone B6 as merely one aspect, an order of shorter distances from the virtual viewpoint Vc is the bone B6 and the bone B5. In this case, as illustrated in FIG. 3, the radius of each of the cylinders of the bone B5 and the bone B6 are set to satisfy B6>B5.

By modeling the three-dimensional skeleton model M2 including the joints JT to J20 and the bones B1 to B17, a capability to express the joints and the bones in the front-back direction, i.e., the depth direction, is improved.

Note that the viewpoint of the skeleton image is not necessarily limited to the virtual viewpoint given to the virtual camera, and may be any one of the viewpoints of the camera 30A to the camera 30N. Furthermore, the viewpoint of the skeleton image is not necessarily fixed, and can be moved according to the track by user setting or GUI operation by the client terminal 50 or the like.

As another aspect, the generation unit 15C can display the three-dimensional skeleton model in association with the captured image from the virtual viewpoint generated using the plurality of captured images, in addition to the captured image from each viewpoint. For example, the generation unit 15C can display the skeleton image and the captured image corresponding to the same frame side by side horizontally or vertically, or can display the skeleton image superimposed on the captured image by projecting the three-dimensional skeleton model onto the captured image. When the three-dimensional skeleton model is projected on the captured image in this manner, a joint angle is used in addition to the position of each joint, so that a capability to express a twisted joint can be improved.

Figure 4:
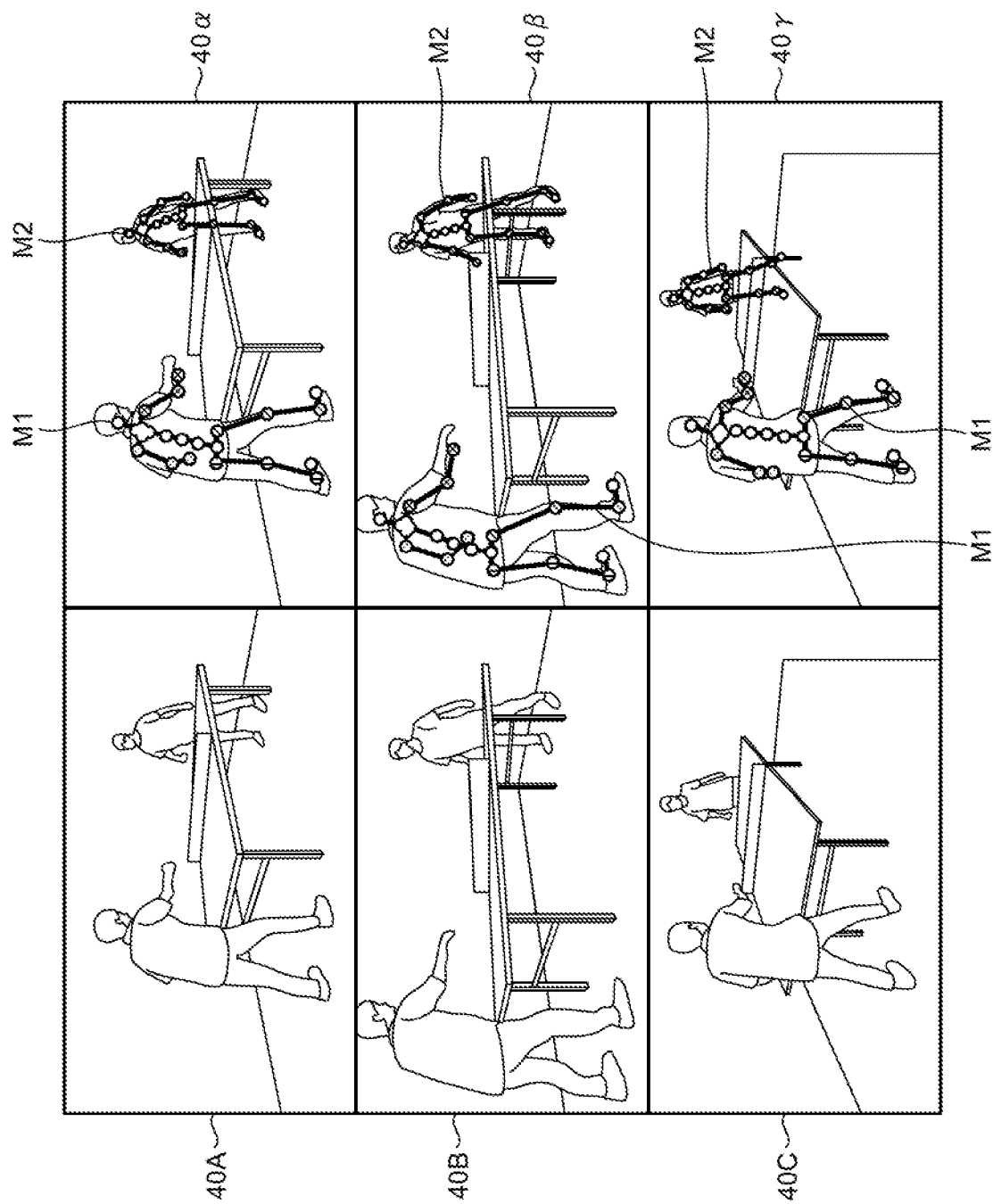
FIG. 4 is a diagram illustrating an example of a method of associating a skeleton image and a captured image.

FIG. 4 is a diagram illustrating an example of a method of associating the skeleton image with the captured image. As illustrated in FIG. 4, captured images 40A to 40C from three viewpoints of the cameras 30A to 30C are displayed. Superimposed images 40α to 40γ in which the skeleton images from the respective viewpoints are superimposed on the captured images 40A to 40C are displayed by projecting the three-dimensional skeleton models M1 and M2 corresponding to the respective viewpoints on the captured images 40A to 40C on the right side of the captured images 40A to 40C. In a case where the skeleton image is superimposed on the captured image in this manner, from the view of increasing the contrast of the skeleton image as compared with the captured image, the superimposed images 40α to 40γ can be generated after performing image processing to decrease the contrast ratio of the captured image, such as decreased luminance and chroma, increased transparency, and the like.

The display of the superimposed images 40α to 40γ or the side-by-side display of the captured images 40A to 40C and the superimposed images 40α to 40γ as described above can facilitate comparison between the live-action video and the skeleton model.

Note that, when the three-dimensional skeleton model causes occlusion by the three-dimensional model of the environment, it is also possible to control whether or not to draw a portion hidden by the three-dimensional model of the environment in the three-dimensional skeleton model. For example, when legs in the three-dimensional skeleton model M2 are hidden by the table for table tennis in the superimposed image 40γ, it is possible to provide a see-through effect by drawing the legs in the three-dimensional skeleton model M2 or to suppress discomfort by suppressing the drawing of the legs in the three-dimensional skeleton model M2.

1-4. Processing Procedure of Server Device

Figure 5:
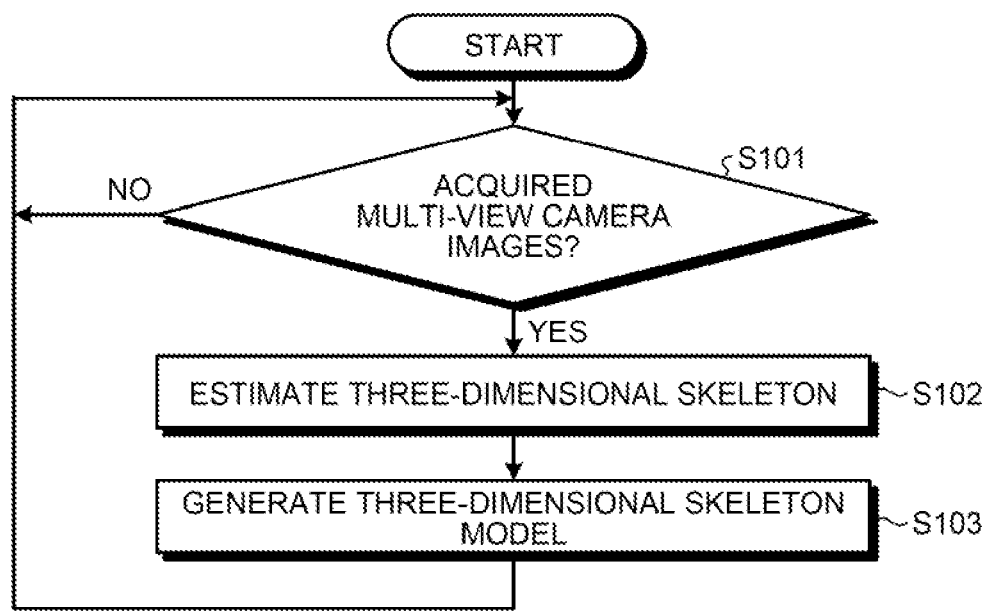
FIG. 5 is a flowchart illustrating an image generation process according to the first embodiment.

FIG. 5 is a flowchart illustrating a procedure of an image generation process according to the first embodiment. As an example, this process can be continuously performed until acquisition of a captured image from the camera 30 is completed As illustrated in FIG. 5, a process in Step S102 is suspended until the acquisition unit 15A acquires the captured image of each viewpoint (Step S101 No). Then, when the captured image from each viewpoint is acquired by the acquisition unit 15A (Step S101 Yes), the estimation unit 15B estimates the three-dimensional skeleton based on the captured image from each viewpoint (Step S102).

In addition, the generation unit 15C generates the three-dimensional skeleton model in which the three-dimensional skeleton estimated in Step S102 is modeled (Step S103). After the process in Step S103 is performed in this manner, the process proceeds to Step S101.

1-5. One Aspect of Effect

As described above, the server device 10 of the present disclosure estimates the three-dimensional skeleton from multi-view captured images as a part of the above-described image generation service. As a result, a skeleton part hidden by occlusion can be estimated, and three-dimensional skeleton estimation can also be realized by markerless motion capture. Then, the server device 10 of the present disclosure generates the three-dimensional skeleton model in which the three-dimensional skeleton estimated in this manner is modeled. Therefore, according to the server device 10 of the present disclosure, it is possible to generate a stereoscopic skeleton model.

2. Second Embodiment

Various effects can be added to the three-dimensional skeleton model described in the first embodiment. Hereinafter, as a second embodiment, contents of various effects and a setting method thereof will be described.

2-1. Functional Configuration Example of Server Device

Figure 6:
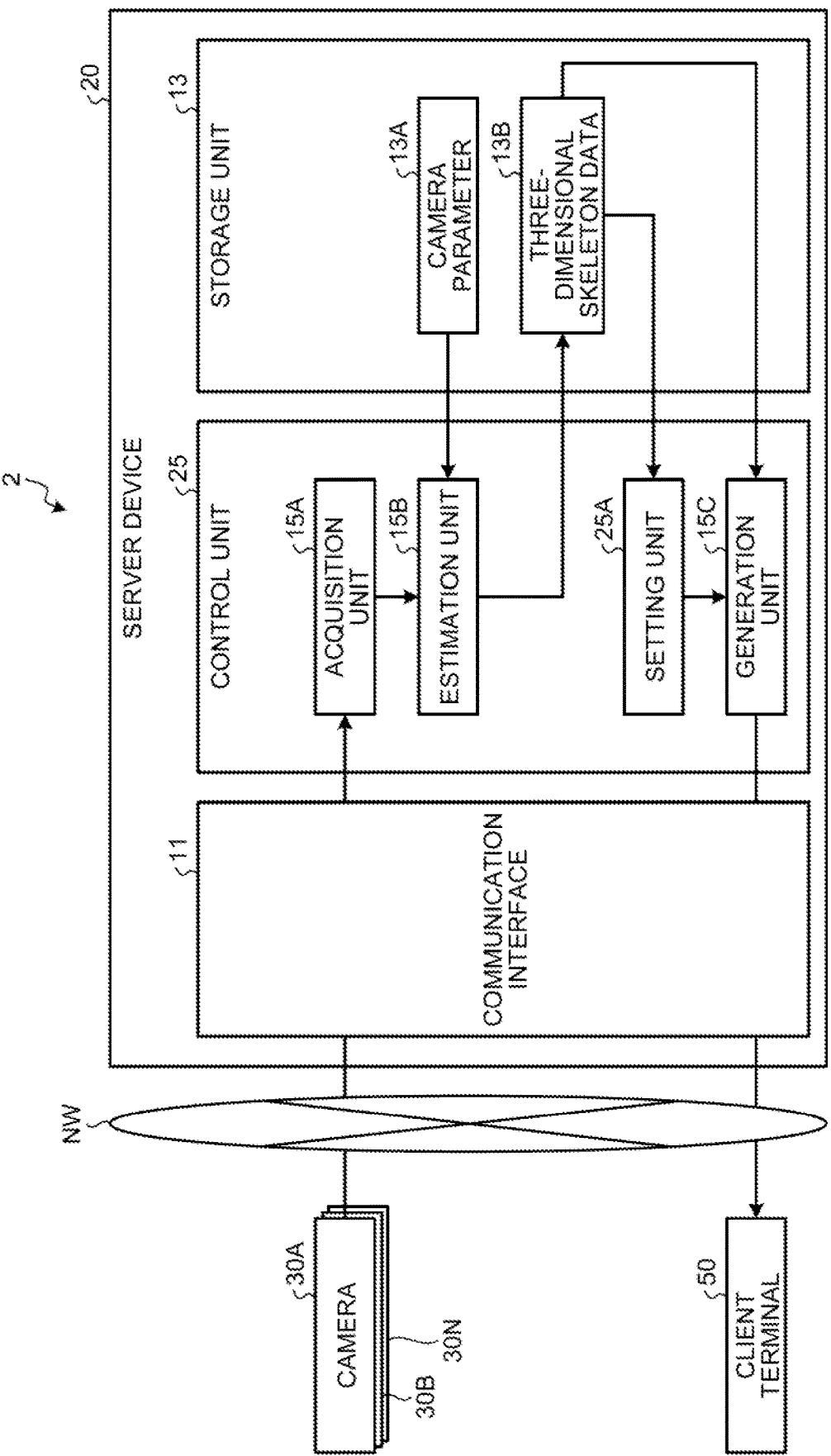
FIG. 6 is a diagram illustrating a system configuration example according to a second embodiment.

FIG. 6 is a diagram illustrating a system configuration example according to the second embodiment. As illustrated in FIG. 6, the system 2 is different from the system 1 illustrated in FIG. 1 in that the system 2 includes a server device 20 in which the function related to the effect described above is added on. Furthermore, the server device 20 is different from the server device 10 illustrated in FIG. 1 in that the control unit 25 further includes a setting unit 25A.

<2-1-1. Setting Unit>

The setting unit 25A is a processing unit that sets an effect to a three-dimensional skeleton model.

Figure 7:
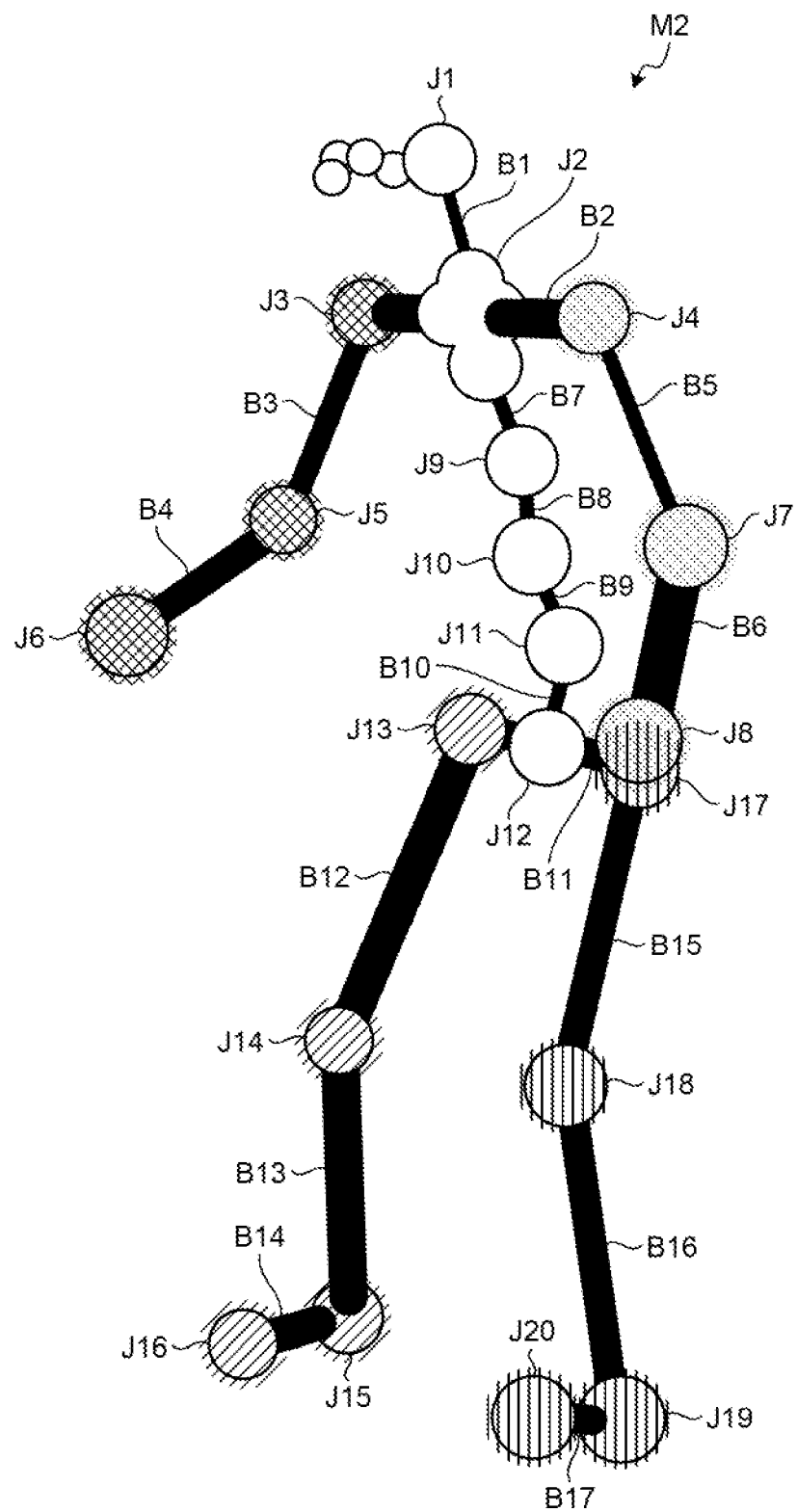
FIG. 7 is a diagram illustrating an example of a heat map effect.

As one aspect, the setting unit 25A can set a heat map effect to a skeleton part such as a joint or a bone of the three-dimensional skeleton model. FIG. 7 is a diagram illustrating an example of the heat map effect. FIG. 7 illustrates an example in which the heat map effect is added to the three-dimensional skeleton model M2 illustrated in FIG. 3. As illustrated in FIG. 7, heat maps with different colors depending on skeleton parts are added to the joints included in the three-dimensional skeleton model M2. More specifically, the color of the heat map that covers the joint is set to be distinguished according to a difference in skeleton parts of a right arm, a left arm, a right leg, and a left leg. For example, a heat map of a first color corresponding to lattice-pattern hatching in the drawing is added to a joint J3, a joint 35, and a joint J6 included in the right arm. Furthermore, a heat map of a second color corresponding to dotted hatching in the drawing is added to a joint 34, a joint J7, and a joint J8 included in the left arm. Furthermore, a heat map of a third color corresponding to oblique-line hatching in the drawing is added to joints J13 to J16 included in the right leg. Furthermore, a heat map of a fourth color corresponding to vertical-line hatching in the drawing is added to joints J17 to J20 included in the left leg.

By setting the heat maps with different colors according to the position of the skeleton part in this way, it is possible to easily identify joint portions. Note that although FIG. 7 illustrates the example in which the heat map effect is added to the joint, it is apparent that a similar effect can be added to a bone. In addition, FIG. 7 illustrates the example in which the heat maps with different colors are set according to the position of the skeleton part. However, the heat maps with different sizes may be set according to the position of the skeleton part.

As another aspect, the setting unit 25A can set a highlighting effect of the display color to a skeleton part such as a joint or a bone of the three-dimensional skeleton model. As an example, the setting unit 25A can set a color change effect according to movement of the skeleton part such as the joint or the bone.

As an example of an index of movement of the skeleton part used as the reference for adding the effect, the setting unit 25A can use a movement amount of the skeleton part. For example, the setting unit 25A can calculate a movement amount of the skeleton part obtained from a position of the skeleton part in a frame in which the skeleton image is being displayed and a position of the skeleton part in a frame before the displayed frame. For example, assuming that the skeleton image of the Nth frame is being displayed, the movement amount of the skeleton part from the Nth−1 frame to the Nth frame can be calculated. Then, the setting unit 25A sets higher chroma to the skeleton part as the movement amount increases, and sets lower chroma to the skeleton part as the movement amount decreases. In addition, the setting unit 25A can also set, as a display color of the applicable skeleton part, a color of a range corresponding to the movement amount of the skeleton part in colors allocated to each movement range. As a result, an effect of distinguishing a magnitude of movement amount by display color can be realized. Note that, an example of calculating the movement amount of the skeleton part between adjacent frames has been described here. However, a frame interval used for calculating the movement amount may not necessarily be the adjacent frames. For example, the movement of the skeleton part can also be calculated between a predetermined number of frames.

In addition, the setting unit 25A can also set a highlighting effect to a skeleton part of which the magnitude of movement amount is equal to or greater than a predetermined threshold in the skeleton parts included in the three-dimensional skeleton model. In this case, from the aspect of emphasizing the skeleton part having a large relative difference in movement in the skeleton parts, the setting unit 25A can set the highlighting effect, such as different display colors and blinking display, to the skeleton part of which the subtraction value of movement amount is equal to or more than a predetermined threshold. The subtraction value is calculated by subtracting movement amount of the center of gravity of the entire three-dimensional skeleton model from the movement amount of each skeleton part.

Figure 8:
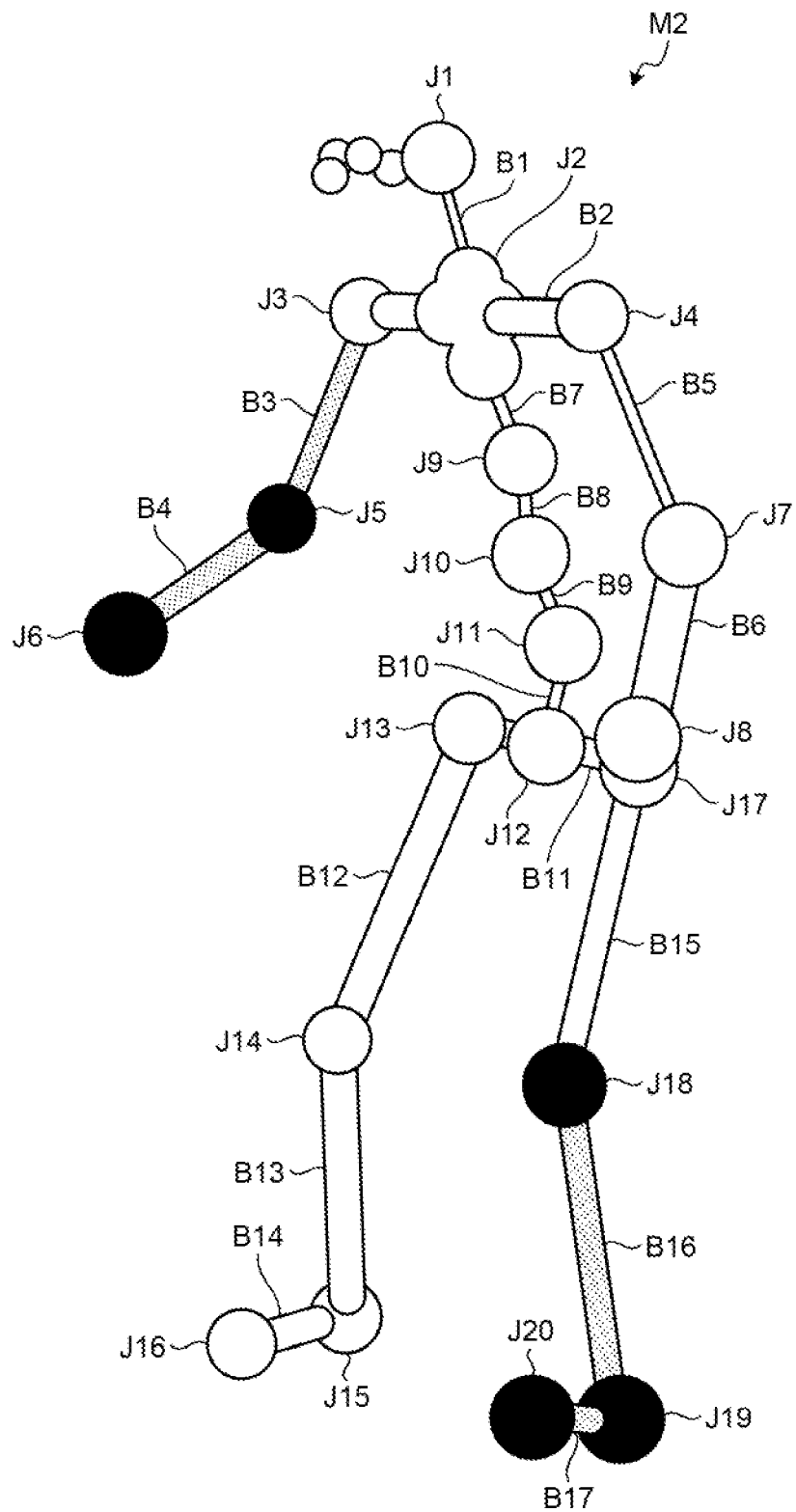
FIG. 8 is a diagram illustrating an example of a highlighting effect.

FIG. 8 is a diagram illustrating an example of the highlighting effect. In FIG. 8, the highlighting effect is added to skeleton parts of which the subtraction values obtained by subtracting the movement amount of the center of gravity of the entire three-dimensional skeleton model M2 from the movement amounts of skeleton parts of the joints J1 to J20 and bones B1 to B17 are equal to or greater than the threshold. As illustrated in FIG. 8, among the joints J1 to J20, display colors of the joint J5, the joint J6, the joint J18, the joint J19, and the joint J20 of which the subtraction values of the movement amount are equal to or greater than the threshold are set to the display color different from the display color of other joints. Further, among the bones B1 to B17, the display colors of the bones B3, B4, B16, and B17 of which the subtraction values of the movement are equal to or greater than the threshold are set to the display color different from the display color of other bones.

In this way, by setting the highlighting effect to the skeleton part of which the subtraction value obtained by subtracting the movement amount of the center of gravity of the entire three-dimensional skeleton model M2 from the movement amount of the skeleton part is equal to or greater than the threshold, it is possible to easily identify the skeleton part of which the movement is relatively large as compared with other parts. For example, in the example of table tennis, it is possible to support evaluation, analysis, and the like of a playing posture by identifying a skeleton part that moves vigorously at swinging a racket or the like.

Note that, here, the movement amount of the skeleton part has been described only as an example of the movement index. However, the movement index is not limited thereto. For example, a speed can be calculated for each skeleton part by calculating a change in the movement amount per unit time, for example, per frame, from the movement amount in a predetermined number of frames. In addition, acceleration can be calculated for each skeleton part by calculating a change in speed per unit time, such as per frame, from the speed in a predetermined number of frames. These speeds and accelerations can be used to set the above-described highlighting effect.

Furthermore, an example is given here with respect to setting the highlighting effect according to the change in movement of the skeleton part. However, the heat map effect with different colors or different sizes can also be set according to the change in movement of the skeleton part. Furthermore, conversely, it is also possible to set the highlighting effect according to the position of the skeleton part.

Furthermore, although the example of changing the display colors of the joints and the bones has been described, an effect of changing the size of the joint sphere, the thickness of the bone cylinder, or the size of the heat map may be set. For example, the size of the joint sphere corresponding to the skeleton part, the thickness of the bone cylinder, or the size of the heat map can be set to increase as the movement amount increases. Or, the size of the joint sphere corresponding to the skeleton part, the thickness of the bone cylinder, or the area size of the heat map can be set to decrease as the movement amount decreases.

2-2. Processing Procedure of Server Device

Figure 9:
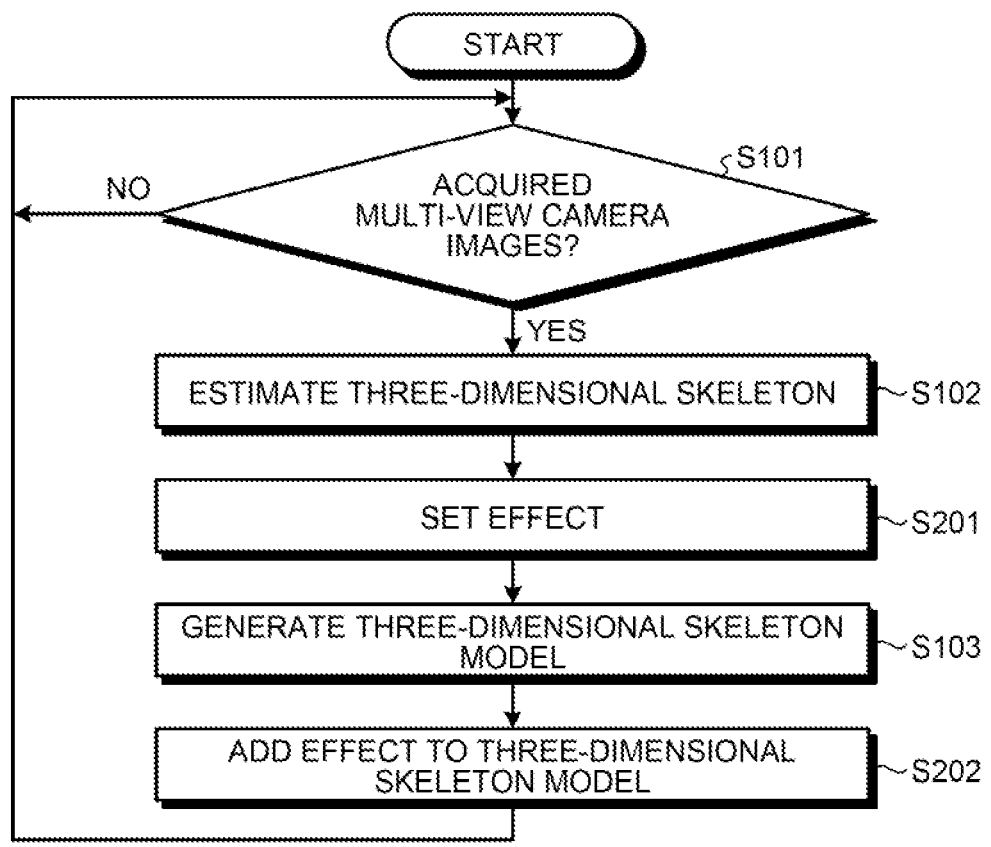
FIG. 9 is a flowchart illustrating steps of an image generation process according to the second embodiment.

FIG. 9 is a flowchart illustrating a procedure of an image generation process according to the second embodiment. As an example, this process can be continuously performed until acquisition of a captured image from the camera 30 is completed As illustrated in FIG. 9, the process in Step S102 is suspended until the acquisition unit 15A acquires the captured image of each viewpoint. (Step S101 No). Then, when the captured image from each viewpoint is acquired by the acquisition unit 15A (Step S101 Yes), the estimation unit 15B estimates the three-dimensional skeleton based on the captured image from each viewpoint (Step S102).

Then, the setting unit 25A sets the heat map effect or the highlighting effect according to the three-dimensional skeleton part and movement amount estimated in Step S102 (Step S201).

Thereafter, the generation unit 15C generates a three-dimensional skeleton model in which the three-dimensional skeleton estimated in Step S102 is modeled (Step S103). Then, the generation unit 15C adds the effect set in Step S201 to the three-dimensional skeleton model generated in Step S103 (Step S202). After the process in Step S202 is performed in this manner, the process proceeds to the process in Step S101.

2-3. One Aspect of Effect

As described above, the server device 20 of the present disclosure sets the heat map effect and the highlighting effect according to the three-dimensional skeleton parts and the movement amounts as a part of the above-described image generation service. Therefore, according to the server device 20 of the present disclosure, it is possible to enhance the visibility of the skeleton parts according to the purpose of evaluation, analysis, and the like of the video.

3. Application Example

Hereinafter, application examples of the first embodiment and the second embodiment will be described.

3-1. CG Character Model

Figure 10:
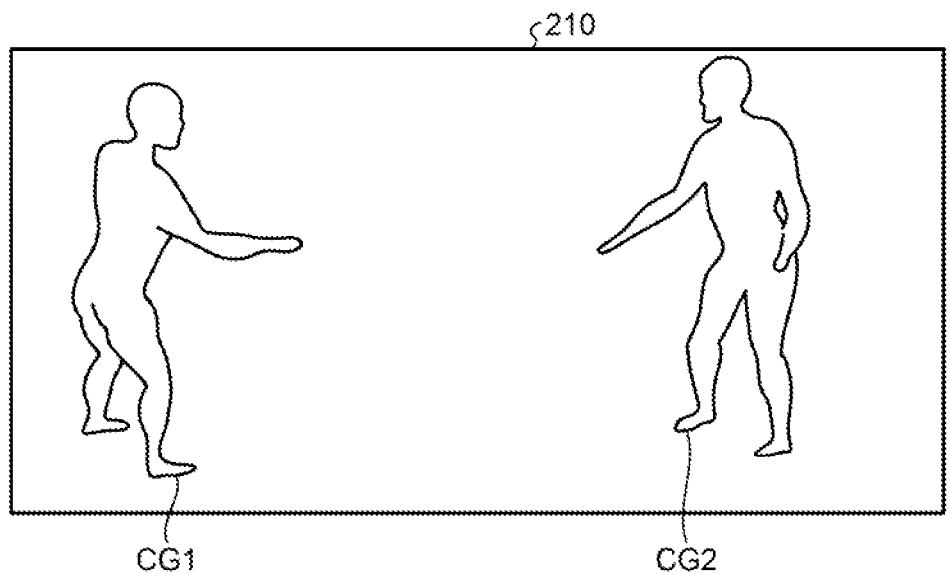
FIG. 10 is a diagram illustrating an example of a CG character model.

The first embodiment and the second embodiment give an example of generating a three-dimensional skeleton model and displaying the model on the client terminal 50. However, a CG character model can be generated instead of the three-dimensional skeleton model. FIG. 10 is a diagram illustrating an example of the CG character model. As illustrated in FIG. 10, a CG character model CG1 corresponding to the three-dimensional skeleton model M1 and a CG character model CG2 corresponding to the three-dimensional skeleton model M2 are rendered in a CG image 210.

With the display of the CG character model CG1 and the CG character model CG2, it is possible to improve understanding of a situation and a viewing effect.

In addition, the three-dimensional skeleton model and the CG character model can be displayed side-by-side, and viewpoint movement can also be linked. This makes it possible to achieve both understanding of the situation (skeleton model is easy to understand) and confirmation of the finish (CG character). In addition, by drawing the CG character model from the viewpoint of the live-action camera, e.g., any one of the viewpoints of the cameras 30A to 30N, it is possible to facilitate comparison with a live-action picture, thereby improving the effect of understanding the situation.

3-2. Link with Individual Identification

For example, the server device 10 or the server device 20 identifies an individual by executing an authentication process such as face authentication and iris authentication of a person included in the captured image. Then, the server device 10 or the server device 20 can select the CG character model or the effect according to a personal setting corresponding to the individual identified as a result of the authentication process with reference to the personal setting of the CG character model or the effect.

3-3. Visualization of Skeleton Estimation Accuracy

The second embodiment gives an example of using the heat map display for identifying the skeleton part. The color or size of the heat map can be changed according to a certainty factor of an estimation result of the three-dimensional skeleton in the skeleton part. For example, as the certainty of the estimation result is higher, chroma of the color of the heat map of the skeleton part can be increased, or the size of the heat map of the skeleton part can be increased. For example, as the certainty of the estimation result is lower, the chroma of the color of the heat map of the skeleton part can be decreased, or the area of the heat map of the skeleton part can be decreased. As a result, the estimation accuracy of the three-dimensional skeleton can be visualized on the three-dimensional skeleton model.

3-4. Track of Skeleton Part

The first embodiment and the second embodiment give an example of modeling the skeleton part only in a frame in which the latest captured image is acquired by the acquisition unit 15A. However, the position of the skeleton part can be modeled across a predetermined number of past frames.

Figure 11:
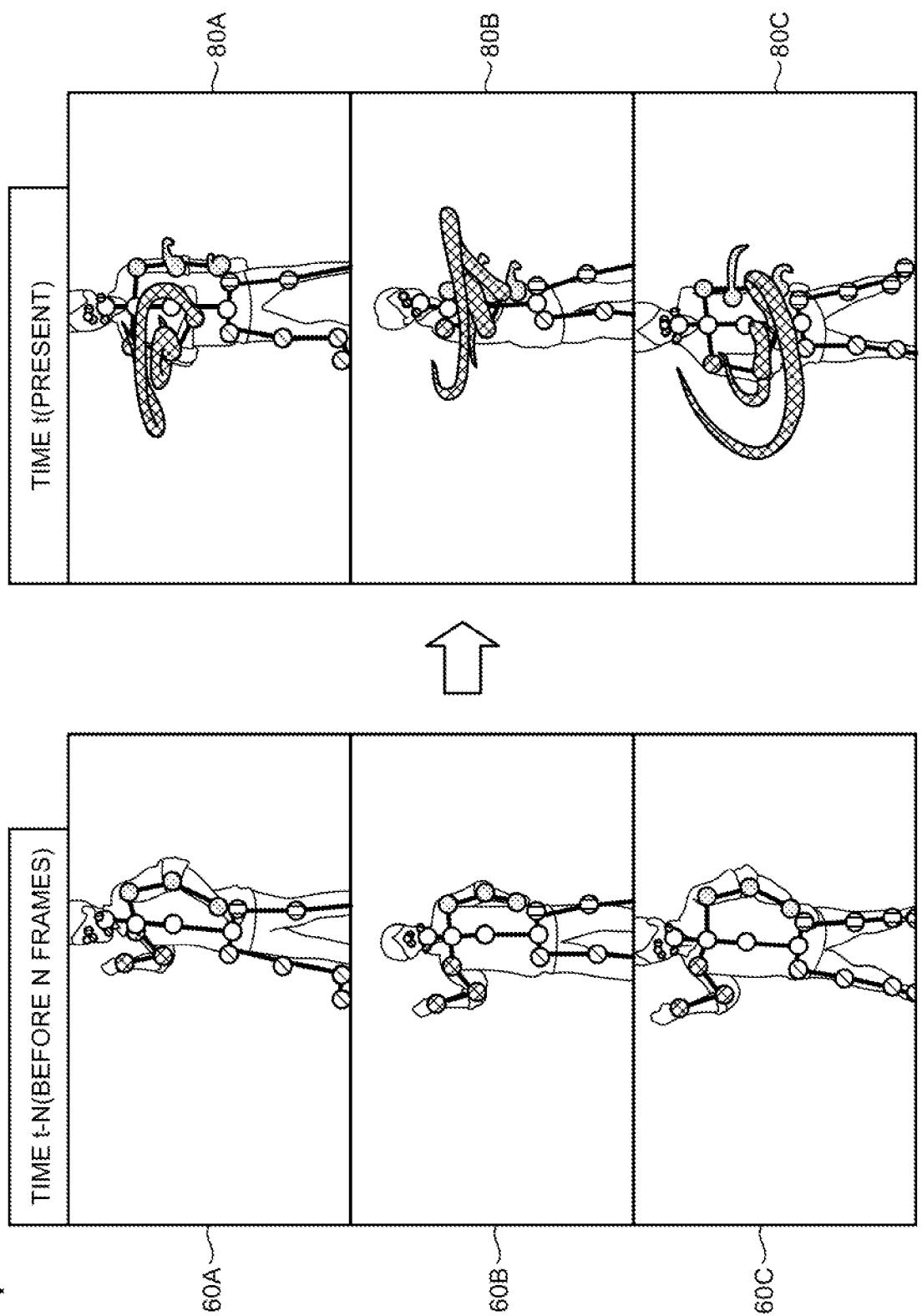
FIG. 11 is a diagram illustrating an example of a track of a position of a skeleton part.
Figure 12:
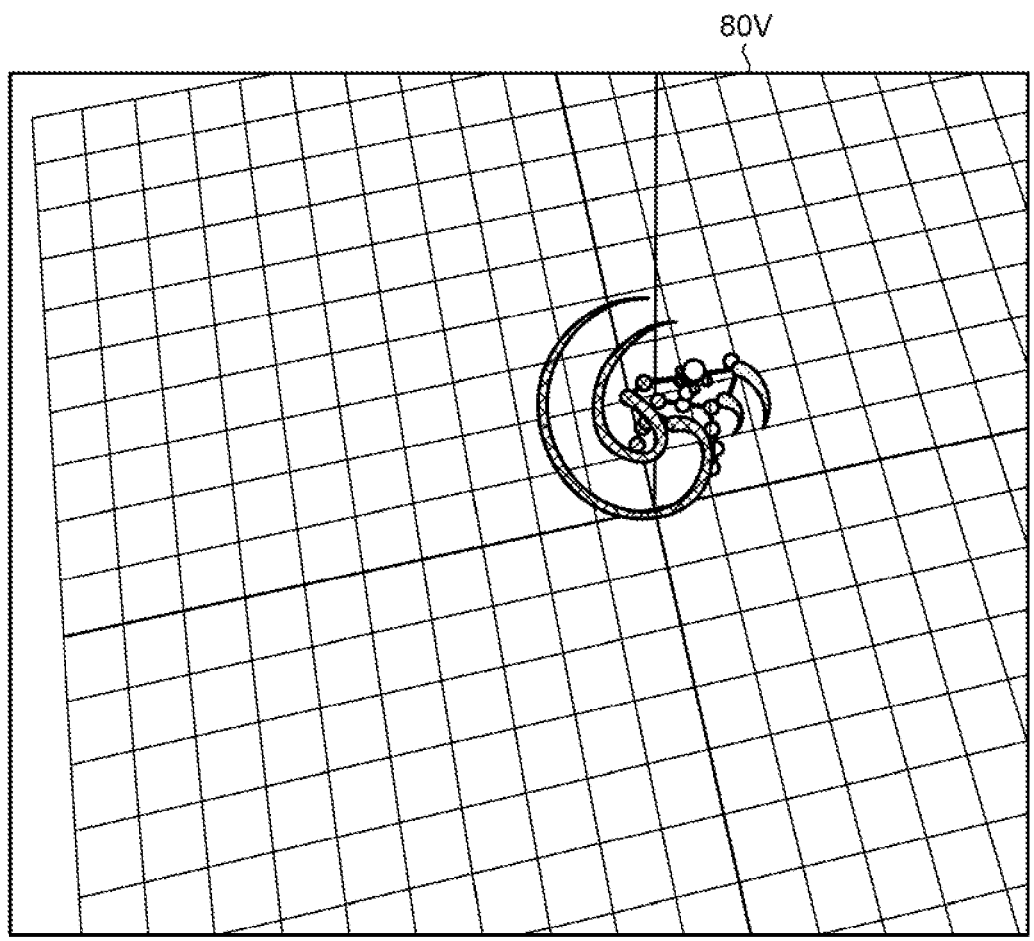
FIG. 12 is a diagram illustrating an example of the track of the position of the skeleton part.

FIG. 11 and FIG. 12 are diagrams illustrating an example of a position track of a skeleton part. FIG. 11 illustrates superimposed images 60A to 60C in which a position of a skeleton part in the t-Nth frame is superimposed on three captured images of the cameras 30A to 30C in the t-Nth frame that is N frames before the t-th frame in which the latest captured image is acquired by the acquisition unit 15A. On the right side of these superimposed images 60A to 60C, superimposed images 80A to 80C in which tracks of positions of skeleton parts in N frames from the t-Nth to t-th frames are superimposed on three captured images of the cameras 30A to 30C. Furthermore, FIG. 12 illustrates a superimposed image 80V in which tracks of positions of skeleton parts in N frames from the t-Nth to the t-th frames are superimposed on a captured image of a bird's eye viewpoint (virtual viewpoint) in the t-th frame. Furthermore, in the superimposed images 80A to 80C illustrated in FIG. 11 and the superimposed image 80V illustrated in FIG. 12, tracks of the positions of the joints in N frames are superimposed, focusing on the joints of which the subtraction value obtained by subtracting the movement amount of the center of gravity of the entire three-dimensional skeleton model in the t-th frame is equal to or greater than the threshold, and only the positions of the skeleton parts in the t-th frame are superimposed for other skeleton parts.

Here, in a case where the tracks of the positions of the joints in N frames are superimposed in the superimposed images 80A to 80C and the superimposed image 80V, a radius of a joint sphere in the past frame other than the t-th frame is set to be smaller than a radius of the joint sphere in the t-th frame. In other words, for the same joint, the radius of the joint sphere in N frames is set by setting the radius of the joint sphere in the t-th frame as the maximum value and monotonically decreasing the radius of the joint sphere in the t-th frame as going back from the t-th frame to the past frames. In addition, luminance and chroma can be monotonically decreased or transparency can be monotonically increased from the t-th frame to the past frames as compared with the joint in the t-th frame.

According to the superimposed images 80A to 80C and the superimposed image 80V generated in this manner, it is possible to visualize a positional track of the skeleton part. Furthermore, since the radius of the joint sphere in the t-th frame is monotonously decreased as going back from the t-th frame to the past frames, a time-series change in the position of the skeleton part is more easily identified. Note that, here, an example of generating the positional track of the joint has been described, but it is apparent that the positional track of the bone and the positional track of the heat map can also be generated by the same method.

4. Modifications

Among the processes described in the above embodiments, all or part of the processes described as being performed automatically can be performed manually, or all or part of the processes described as being performed manually can be performed automatically by a known method. In addition, the processing procedure, specific name, and information including various data and parameters illustrated in the above document and the drawings can be arbitrarily changed unless otherwise specified. For example, various types of information illustrated in each drawing are not limited to the illustrated information.

In addition, each component of each device illustrated in the drawings is functionally conceptual, and is not necessarily physically configured as illustrated in the drawings. In other words, a specific form of distribution and integration of each device is not limited to the illustrated form, and all or a part thereof can be functionally or physically distributed and integrated in an arbitrary unit according to various loads, usage conditions, and the like.

Note that the effects described in the present specification are merely examples and not limited thereto, and other effects may be provided.

5. Hardware Configuration

Figure 13:
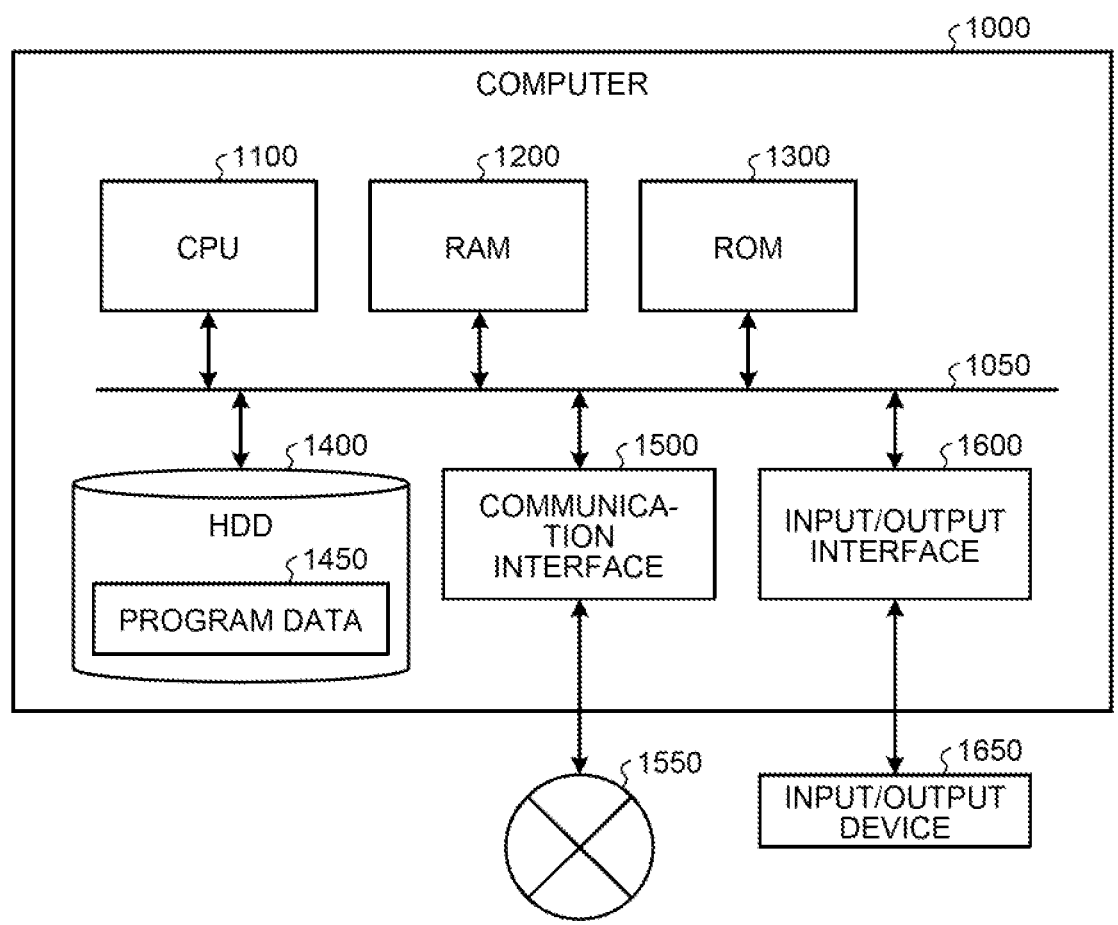
FIG. 13 is a diagram illustrating a hardware configuration example of a computer.

The server device 10 according to each of the above-described embodiments is realized by, for example, a computer 1000 having a configuration as illustrated in FIG. 13. Hereinafter, the server device 10 or the server device 20 according to the above-described embodiments will be described as an example. FIG. 13 is a hardware configuration diagram illustrating an example of the computer 1000. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of a program stored in the ROM 1300 or the HDD 1400, and controls each unit. For example, the CPU 1100 develops a program stored in the ROM 1300 or the HDD 1400 into the RAM 1200, and executes processes corresponding to various programs.

The ROM 1300 stores a boot program such as a basic input output system (BIOS) executed by the CPU 1100 when the computer 1000 is activated, a program dependent on hardware of the computer 1000, and the like.

The HDD 1400 is a computer-readable recording medium that non-transiently records a program executed by the CPU 1100, data used by the program, and the like. Specifically, the HDD 1400 is a recording medium that records a development support program according to the present disclosure, which is an example of program data 1450.

The communication interface 1500 is an interface for the computer 1000 to connect to an external network 1550 (e.g., the Internet). For example, the CPU 1100 receives data from another apparatus or transmits data generated by the CPU 1100 to another apparatus via the communication interface 1500.

The input/output interface 1600 is an interface for connecting an input/output device 1650 and the computer 1000. For example, the CPU 1100 receives data from an input device such as a keyboard or a mouse via the input/output interface 1600. In addition, the CPU 1100 transmits data to an output device such as a display, a speaker, or a printer via the input/output interface 1600. Furthermore, the input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the server device 10 or the server device 20 according to the above-described embodiments, the CPU 1100 of the computer 1000 realizes each functional unit included in the control unit 15 by executing the image generation program loaded on the RAM 1200. In addition, the HDD 1400 stores the image generation program according to the present disclosure and data in a content storage unit 121. Note that the CPU 1100 reads the program data 1450 from the HDD 1400 and executes the program data, but as another example, these programs may be acquired from another device via the external network 1550.

The present technology can also have the following configurations.

(1)
An information processing apparatus comprising:
an estimation unit that estimates a three-dimensional skeleton based on images captured from a plurality of viewpoints; and
a generation unit that generates a skeleton model by modeling the three-dimensional skeleton.

(2)
The information processing apparatus according to (1), wherein
the generation unit models a joint in a spherical shape and a bone in a cylindrical shape in the three-dimensional skeleton.

(3)
The information processing apparatus according to (2), wherein
the generation unit sets a radius of a sphere of the joint or a radius of a cylinder of the bone according to a distance between any one of the plurality of viewpoints or a virtual viewpoint and the joint or the bone.

(4)
The information processing apparatus according to (3), wherein
the generation unit increases the radius of the sphere of the joint or the radius of the cylinder of the bone as the distance decreases, or decreases the radius of the sphere of the joint or the radius of the cylinder of the bone as the distance increases.

(5)
The information processing apparatus according to (1), wherein
the skeleton model is displayed in association with the images captured from the plurality of viewpoints or a virtual viewpoint.

(6)
The information processing apparatus according to (5), wherein the skeleton model is displayed side by side horizontally or vertically with a captured image of a same frame as the skeleton model.

(7)
The information processing apparatus according to (5), wherein
the skeleton model is displayed by being superimposed on a captured image of a same frame as the skeleton model.

(8)
The information processing apparatus according to (7), wherein
the captured image is displayed with decreased luminance or chroma, or with increased transparency.

(9)
The information processing apparatus according to (2), further comprising a setting unit that sets an effect to the skeleton model.

(10)
The information processing apparatus according to (9), wherein
the setting unit sets the effect of a heat map covering the joint or the bone.

(11)
The information processing apparatus according to (10), wherein
the setting unit sets the heat map with a different color or a different size according to a position of the joint or the bone.

(12)
The information processing apparatus according to (10), wherein
the setting unit sets the heat map with a different color or a different size according to a movement amount, speed, or acceleration of a skeleton part of the joint or the bone.

(13)
The information processing apparatus according to (10), wherein
the setting unit sets the heat map with a different color or a different size according to a certainty of an estimation result of the three-dimensional skeleton in a skeleton part of the joint or the bone.

(14)

The information processing apparatus according to (9), wherein
the setting unit sets an effect of highlighting a skeleton part of the joint or the bone.

(15)

The information processing apparatus according to (14), wherein
the setting unit sets a different display color according to a movement amount, speed, or acceleration of the skeleton part of the joint or the bone.

(16)

The information processing apparatus according to (14), wherein
the setting unit sets the effect of highlighting the skeleton part of which a movement amount, speed, or acceleration is equal to or greater than a predetermined threshold in the skeleton part of the joint or the bone.

(17)

The information processing apparatus according to (16), wherein
the setting unit sets the effect of highlighting the skeleton part of which a subtraction value obtained by subtracting a movement amount of a center of gravity of the skeleton model from the movement amount of the skeleton part of the joint or the bone is equal or greater than a predetermined threshold.

(18)

The information processing apparatus according to (2), wherein
the generation unit models a track of a position of a skeleton part of the joint or the bone across a predetermined number of past frames from a latest frame in which the images captured are acquired.

(19)

The information processing apparatus according to (18), wherein the generation unit sets the radius of the joint sphere or the radius of the bone cylinder in a past frame other than the latest frame to be smaller than the radius of the joint sphere or the bone cylinder in the latest frame.

(20)

The information processing apparatus according to (19), wherein the generation unit sets the radius of the joint sphere or the radius of the bone cylinder in the past frame by setting the radius of the joint sphere or the radius of the bone cylinder in the latest frame as a maximum value and monotonically decreasing the radius of the joint sphere or the radius of the bone cylinder in the latest frame as going back from the latest frame to the past frame.

(21)

An information processing method executing by a computer:
estimating a three-dimensional skeleton based on images captured from a plurality of viewpoints; and
generating a skeleton model by modeling the three-dimensional skeleton.

(22)

An information processing program causing a computer to execute:
estimating a three-dimensional skeleton based on images captured from a plurality of viewpoints; and
generating a skeleton model by modeling the three-dimensional skeleton.

REFERENCE SIGNS LIST

1 SYSTEM
10 SERVER DEVICE
11 COMMUNICATION INTERFACE
13 STORAGE UNIT
13A CAMERA PARAMETERS
13B THREE-DIMENSIONAL SKELETON DATA
15 CONTROL UNIT
15A ACQUISITION UNIT
15B ESTIMATION UNIT
15C GENERATION UNIT
30A, 30B, 30N CAMERA
50 CLIENT TERMINAL

The invention claimed is:

1. An information processing apparatus comprising:
processing circuitry configured to
estimate a three-dimensional skeleton based on images captured from a plurality of viewpoints, and
generate a skeleton model by modeling the three-dimensional skeleton, wherein
the processing circuitry is configured to
model a joint in a spherical shape or a bone in a cylindrical shape in the three-dimensional skeleton, and
set a radius of a sphere of the joint or a radius of a cylinder of the bone according to a distance between any one of the plurality of viewpoints or a virtual viewpoint and the joint or the bone.

2. The information processing apparatus according to claim 1, wherein
the processing circuitry is configured to increase the radius of the sphere of the joint or the radius of the cylinder of the bone as the distance decreases, or decrease the radius of the sphere of the joint or the radius of the cylinder of the bone as the distance increases.

3. The information processing apparatus according to claim 1, wherein
the skeleton model is displayed in association with the images captured from the plurality of viewpoints or a virtual viewpoint.

4. The information processing apparatus according to claim 3, wherein
the skeleton model is displayed side by side horizontally or vertically with a captured image of a same frame as the skeleton model.

5. The information processing apparatus according to claim 3, wherein
the skeleton model is displayed by being superimposed on a captured image of a same frame as the skeleton model.

6. The information processing apparatus according to claim 5, wherein
the captured image is displayed with decreased luminance or chroma, or with increased transparency.

7. The information processing apparatus according to claim 1, wherein the processing circuitry is configured to set an effect to the skeleton model.

8. The information processing apparatus according to claim 7, wherein
the processing circuitry is configured to set the effect of a heat map covering the joint or the bone.

9. The information processing apparatus according to claim 8, wherein
the processing circuitry is configured to set the heat map with a different color or a different size according to a position of the joint or the bone.

10. The information processing apparatus according to claim 8, wherein
the processing circuitry is configured to set the heat map with a different color or a different size according to a movement amount, speed, or acceleration of a skeleton part of the joint or the bone.

11. The information processing apparatus according to claim 8, wherein
the processing circuitry is configured to set the heat map with a different color or a different size according to a certainty of an estimation result of the three-dimensional skeleton in a skeleton part of the joint or the bone.

12. The information processing apparatus according to claim 7, wherein
the processing circuitry is configured to set an effect of highlighting a skeleton part of the joint or the bone.

13. The information processing apparatus according to claim 12, wherein
the processing circuitry is configured to set a different display color according to a movement amount, speed, or acceleration of the skeleton part of the joint or the bone.

14. The information processing apparatus according to claim 12, wherein
the processing circuitry is configured to set the effect of highlighting the skeleton part of which a movement amount, speed, or acceleration is equal to or greater than a predetermined threshold in the skeleton part of the joint or the bone.

15. The information processing apparatus according to claim 14, wherein
the processing circuitry is configured to set the effect of highlighting the skeleton part of which a subtraction value obtained by subtracting a movement amount of a center of gravity of the skeleton model from the movement amount of the skeleton part of the joint or the bone is equal or greater than a predetermined threshold.

16. The information processing apparatus according to claim 1, wherein
the processing circuitry is configured to model a track of a position of a skeleton part of the joint or the bone across a predetermined number of past frames from a latest frame in which the images captured are acquired.

17. An information processing method executing by a computer, the information processing method comprising:
estimating a three-dimensional skeleton based on images captured from a plurality of viewpoints; and
generating a skeleton model by modeling the three-dimensional skeleton, wherein
the generating includes
modeling a joint in a spherical shape or a bone in a cylindrical shape in the three-dimensional skeleton, and
setting a radius of a sphere of the joint or a radius of a cylinder of the bone according to a distance between any one of the plurality of viewpoints or a virtual viewpoint and the joint or the bone.

18. A non-transitory computer-readable storage medium including computer executable instructions, wherein the instructions, when executed by a computer, cause the computer to perform a method, the method comprising:
estimating a three-dimensional skeleton based on images captured from a plurality of viewpoints; and
generating a skeleton model by modeling the three-dimensional skeleton, wherein
the generating includes
modeling a joint in a spherical shape or a bone in a cylindrical shape in the three-dimensional skeleton, and
setting a radius of a sphere of the joint or a radius of a cylinder of the bone according to a distance between any one of the plurality of viewpoints or a virtual viewpoint and the joint or the bone.

* * * * *